US008862109B2

(12) United States Patent
Fighel

(10) Patent No.: US 8,862,109 B2
(45) Date of Patent: Oct. 14, 2014

(54) SYSTEMS AND METHODS FOR TERMINATING TELEPHONY COMMUNICATIONS TO MOBILE TELEPHONY DEVICES VIA A NON-NATIVE TELEPHONY SERVICE PROVIDER

(75) Inventor: Guy Fighel, Red Bank, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/569,384

(22) Filed: Aug. 8, 2012

(65) Prior Publication Data

US 2013/0165093 A1 Jun. 27, 2013

Related U.S. Application Data

(63) Continuation of application No. 13/492,361, filed on Jun. 8, 2012, now Pat. No. 8,744,422, which is a continuation-in-part of application No. 13/334,849, filed on Dec. 22, 2011, now Pat. No. 8,600,364.

(51) Int. Cl.
*H04M 3/42* (2006.01)

(52) U.S. Cl.
USPC .......... 455/417; 455/414.1; 379/211.01; 379/214.01

(58) Field of Classification Search
USPC ......... 455/414.1, 432.1, 432.3, 433, 453.1, 455/453.2, 428, 560, 41.2, 417, 415, 445, 455/461, 414, 462, 465, 424, 416, 455/435.1–444, 564, 562
See application file for complete search history.

(56) References Cited

U.S. PATENT DOCUMENTS

| | | | |
|---|---|---|---|
| 5,745,850 A * | 4/1998 | Aldermeshian et al. | ...... 455/417 |
| 6,088,126 A | 7/2000 | Khouri et al. | |
| 6,615,037 B1 | 9/2003 | Bharatia et al. | |
| 7,116,975 B1 | 10/2006 | Link et al. | |
| 7,379,436 B2 | 5/2008 | Jiang | |
| 7,551,920 B1 | 6/2009 | Ngan | |
| 7,990,912 B2 | 8/2011 | Nix et al. | |
| 8,139,753 B2 | 3/2012 | Pickering et al. | |
| 2001/0040954 A1 | 11/2001 | Brachman et al. | |
| 2003/0003900 A1 | 1/2003 | Goss et al. | |
| 2004/0076140 A1 | 4/2004 | Begeja et al. | |
| 2004/0248563 A1* | 12/2004 | Ayers et al. | ................... 455/417 |
| 2007/0015536 A1 | 1/2007 | Labauve et al. | |

(Continued)

OTHER PUBLICATIONS

Office Action issued in U.S. Appl. No. 13/334,849 on Mar. 16, 2012.

(Continued)

*Primary Examiner* — Chuong A Ngo
(74) *Attorney, Agent, or Firm* — Nixon & Vanderhye, P.C.; Joseph Pagnotta

(57) ABSTRACT

Systems and methods for terminating telephony communications to a mobile telephony device that is roaming outside of its native service area make use of a mobile roaming termination service. The mobile roaming termination service causes the native mobile telephony service provider that provides service to the mobile telephony device to forward incoming telephony communications directed the native telephone number of the mobile telephony device to a forwarding access number. The mobile roaming termination service receives telephony communications directed to the forwarding access number, and then terminates the telephony communication to the mobile telephony device via any one of multiple different methods. The mobile telephony service provider can be instructed to implement and cancel call forwarding instructions by dialing a special character string on the mobile telephony device.

24 Claims, 8 Drawing Sheets

(56) References Cited

U.S. PATENT DOCUMENTS

| | | |
|---|---|---|
| 2007/0064682 A1 | 3/2007 | Adams et al. |
| 2007/0121580 A1 | 5/2007 | Forte et al. |
| 2007/0167167 A1 | 7/2007 | Jiang |
| 2007/0274485 A1 | 11/2007 | Garrison |
| 2008/0039080 A1 | 2/2008 | Bertagnole et al. |
| 2008/0075261 A1 | 3/2008 | Ramanathan et al. |
| 2008/0153480 A1 | 6/2008 | Jiang |
| 2008/0244148 A1 | 10/2008 | Nix et al. |
| 2008/0261603 A1 | 10/2008 | Sever et al. |
| 2008/0318561 A1 | 12/2008 | Olshansky et al. |
| 2009/0116636 A1 | 5/2009 | Pickering et al. |
| 2009/0141882 A1 | 6/2009 | Baeza |
| 2010/0124323 A1 * | 5/2010 | Herndon et al. ......... 379/211.02 |
| 2011/0096771 A1 | 4/2011 | Saru et al. |
| 2013/0005308 A1 | 1/2013 | Wouterse |
| 2013/0059574 A1 | 3/2013 | Fighel et al. |
| 2013/0065571 A1 | 3/2013 | Fighel et al. |
| 2013/0163477 A1 | 6/2013 | Fighel |
| 2013/0163478 A1 | 6/2013 | Fighel |
| 2013/0163479 A1 | 6/2013 | Fighel |
| 2013/0165083 A1 | 6/2013 | Fighel et al. |
| 2013/0165089 A1 | 6/2013 | Fighel |
| 2013/0165090 A1 | 6/2013 | Fighel |
| 2013/0165091 A1 | 6/2013 | Fighel |
| 2013/0165092 A1 | 6/2013 | Fighel |
| 2013/0165093 A1 | 6/2013 | Fighel |
| 2013/0165094 A1 | 6/2013 | Fighel |
| 2013/0165095 A1 | 6/2013 | Fighel |
| 2013/0165097 A1 | 6/2013 | Fighel |

OTHER PUBLICATIONS

Office Action issued in U.S. Appl. No. 13/492,361 on Jul. 20, 2012.
International Search Report issued in PCT/US2012/071248 on Oct. 4, 2013.
Written Opinion issued in PCT/US2012/071248 on Oct. 4, 2013.
"3rd Generation Partnership Project; Technical Specification Group Core Network and Terminals; Call Forwarding (CF) supplementary services; Stage 2 (Release 11)", 3GPP Standard; 3GPP TS 23.082, 3rd Generation Partnership Project (3GPP), Mobile Competance Centre; 650, Route Des Lucioles, F-06921 Sophia-Antipolis Cedex; France, vol. CT WG4, No. V11.0.0, Dec. 17, 2011, pp. 1-86, XP050554577, [retrieved on Dec. 17, 2011] paragraphs [0001]-[01.2]; figures 1.1, 1.11.
Anonymous: "Easy Call Forwarding App" Android Forums, Dec. 2, 2010 pp. 1-4, XP055066320, Retrieved from the Internet: URL:http://androidforums.com/android-applications/7380-easy-call-forwarding-app.html [retrieved on Jun. 12, 2013] the whole document.
Rosenberg et al., SIP: Session Initiation Protocol, Internet Engineering Task Force, RFC 3261, Jun. 2002, 269 pages.
Dierks et al., The Transport Layer Security (TLS) Protocol, version 1.2, Network Working Group, RFC 5246, Aug. 2008, 105 pages.
Jonsson et al., Public-Key Cryptography Standards (PKCS)#1: RSA Cryptography Specifications, version 2.1, Network Working Group, RFC 3447, Feb. 2003, 72 pages.
"Advance Encryption Standard" (AES), Federal Information Processing Standards Publication 197, Nov. 26, 2001, 51 pages.
Call Forwarding; Wikipedia, the free encyclopedia; Dec. 11, 2012; pp. 1-5.
How to Forward Calls on the iPhone and any other ATT cell phone—Know Your Cell; Dec. 11, 2012; pp. 1-2.
"3rd Generation Partnership Project; Technical Specification Group Services and System Aspects; Voice Call Continuity (VCC) between Circuit Switched (CS) and IP Multimedia Subsystem (IMS); Stage 2 (Release 7)" No. V7.5.0. Dec. 1, 2007. pp. 1-36. XP050363131. paragraphs [0005]—[05.2]; figure 5.1 paragraph [6.5.2.3] paragraphs [Annex:A]—[Annex:A.1].

* cited by examiner

SYSTEMS AND METHODS FOR TERMINATING TELEPHONY COMMUNICATIONS TO MOBILE TELEPHONY DEVICES VIA A NON-NATIVE TELEPHONY SERVICE PROVIDER

CROSS-REFERENCE TO RELATED APPLICATIONS

This application is a continuation of U.S. patent application Ser. No. 13/492,361, filed Jun. 8, 2012 now U.S. Pat. No. 8,744,422, which is itself a continuation-in-part of U.S. patent application Ser. No. 13/334,849, filed Dec. 22, 2011 now U.S. Pat. No. 8,600,364, the entire contents of both of which are herein incorporated by reference.

FIELD OF THE INVENTION

The invention is related to systems and methods for terminating telephony communications to a mobile telephony device. More specifically, the invention relates to systems and methods for terminating telephony communications to a mobile telephony device that is roaming out of its native service area.

BACKGROUND OF THE INVENTION

Mobile telephony devices, such as cellular telephones and mobile computing devices with cellular telephony capabilities, are typically provided with service from a cellular service provider. The cellular service provider typically only provides service to its customers within a defined geographical area, often only within a single country. The area served by the provider is considered the "native" service area for customers who receive cellular telephone service from the provider.

If a customer who receives cellular telephone service from a first "native" cellular service provider travels to an area outside his native service area, the customer's cellular telephone may be capable of receiving cellular service from a second "non-native" cellular service provider that provides coverage in that location. However, because the non-native cellular service provider is not the customer's regular service provider, the customer will be charged special "roaming" fees for receiving incoming communications and for sending outgoing communications from that location. Typically, the non-native cellular service provider charges the user's native cellular service provider for providing service to the customer's cellular telephone, and the native cellular service provider then passes those charges along to the customer as part of his regular monthly bill. This is true for telephone calls, text messages, and other forms of telephony communications.

Roaming charges can be exorbitant compared to fees charged for telephony communications within the customer's native service area. International roaming charges are particularly expensive, as the rates negotiated between carriers for overseas call termination has been at a premium.

DETAILED DESCRIPTION OF PREFERRED EMBODIMENTS

Figure 1:
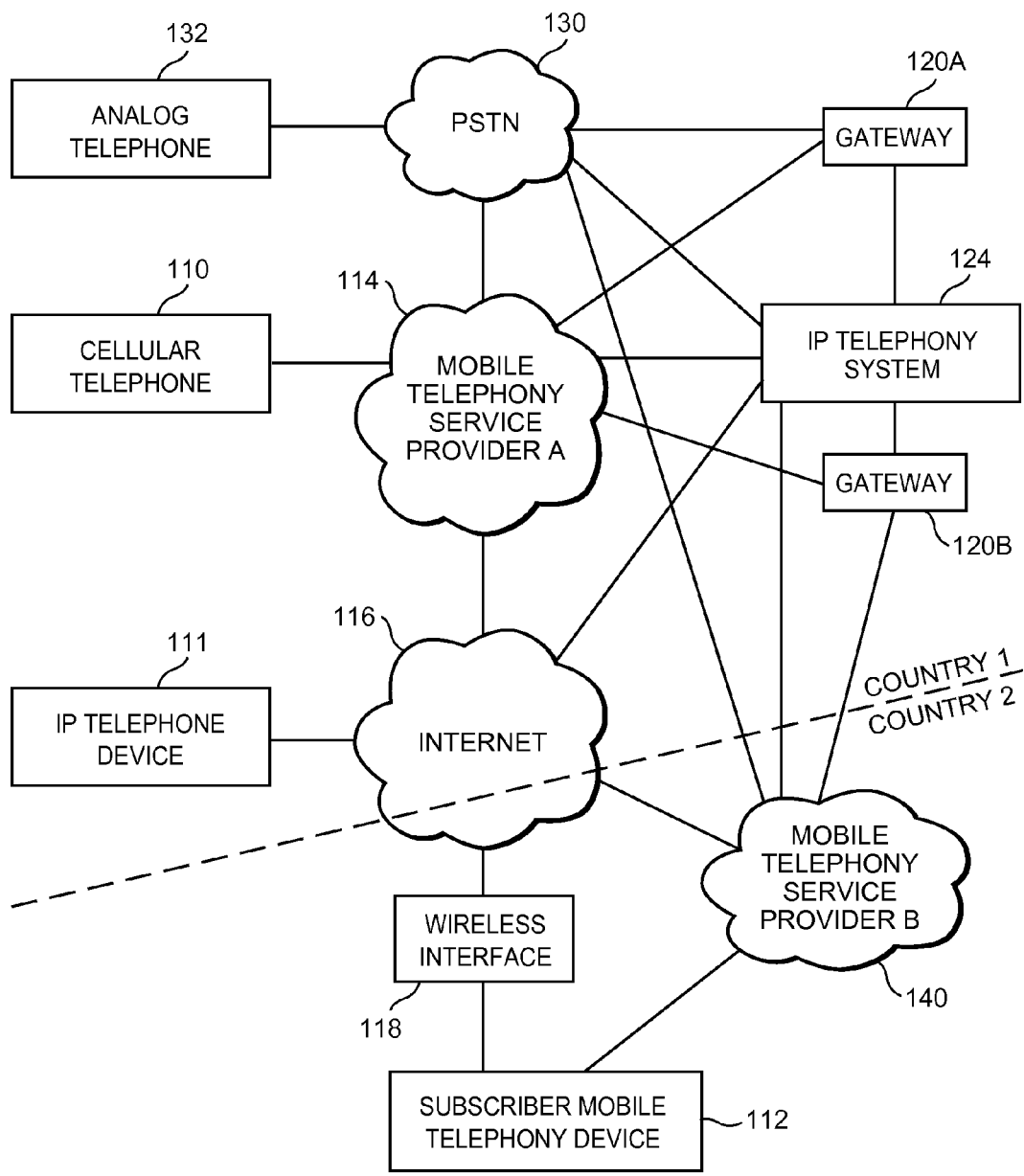
FIG. 1 is a system level representation of elements that interact with each other to terminate telephony communications to mobile telephony devices.

In the following description, references are made to a user's or a customer's mobile telephony device. This term encompass traditional cellular telephones, as well as mobile telephony devices that include additional functionality, such as the ability to wirelessly communicate digital data. These terms also encompass mobile computing devices that include communications capabilities provided by either or both of a cellular transceiver and a wireless digital data transceiver. Examples of such devices include the Apple iPhone™, mobile telephony devices running the Android™ operating system, the Blackberry™ and mobile telephones running the Symbian operating system.

The following description also refers to terminating a telephony communication. This phrase refers to completing an incoming telephony communication, such as a voice or video telephone call, to a telephony device. This phrase also encompasses delivering text messages and other forms of text-based or video-based messaging to a telephony device. This phrase also encompasses other forms of communications that may be carried over a telephony network.

The term "call" or "telephone call" is used in the following description for ease of reference, clarity and brevity. However, all of the systems and methods described below which involve handling, routing and terminating calls would also apply to systems and methods of handling, routing and terminating other forms of telephony-based communications. Thus, the terms call and telephone call are intended to include other forms of telephony-based communications.

The invention provides a method, system and apparatus for terminating a telephony communication to a mobile telephony device that is roaming in such a way that roaming charges preferably are not incurred. To accomplish this, the telephony communication is routed through an Internet Protocol (IP) telephony system which is capable of terminating the telephony communication to the mobile telephony device in ways that do not incur roaming charges. In some instances, such as where no other options exist, the IP telephony system might deliberately cause the telephony communication to be terminated to the mobile telephony device through a non-native mobile telephony service provider. While this would result in the user incurring roaming charges, terminating the telephony communication in this fashion may be the only way to reach the user.

In some systems and methods embodying the invention, telephony communications are effected over a packet-based data network. Signaling that is conducted in the packet-based data network is preferably executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection, allowing users to initiate and receive communications from any location. Of course, while SIP is a preferred protocol for establishing communications over a data network, other signaling protocols could also be used to perform the invention.

FIG. 1 depicts various elements that may be involved in terminating telephony communications to a mobile telephony device. The elements in FIG. 1 include a subscriber mobile telephony device 112. The subscriber mobile telephony device 112 may have a native ability to handle voice over Internet protocol telephony communications sent via a data channel. In other instances, an application running on the subscriber mobile telephony device 112 may provide the capability of handling voice over Internet protocol telephony communications sent via a data channel.

Mobile telephony service provider A 114 is located in country 1 and provides telephony service to mobile telephony devices located in country 1. Mobile telephony service provider A 114 could be, for example, a cellular telephone network. For purposes of the following description, mobile telephony service provider A 114 is the native mobile telephony service provider that provides service to the subscriber mobile telephony device 112.

FIG. 1 also depicts a traditional publically switched telephone network (PSTN) 130. An analog telephone 132 can utilize the PSTN 130 to place and receive calls. The analog telephone 132 could call the subscriber mobile telephony device 112, and the call would be routed through the PSTN 130, then through mobile telephony service provider B 140 to the subscriber mobile telephony device 112.

FIG. 1 also depicts a cellular telephone 110 that is provided with service by mobile telephony service provider A 114. The cellular telephone 110 could call the subscriber mobile telephony device 112 through mobile telephony service provider B 140.

FIG. 1 further depicts an IP telephony device 111 that maintains a data connection to a packet network, such as the Internet 116. The IP telephony device 111 is provided with telephony service by an IP telephony system 124 which is also connected to the Internet 116. If the user of the IP telephony device 111 wishes to establish a call with the subscriber mobile telephony device 112, the IP telephony device 111 sends a call setup request to the IP telephony system 124 via the Internet 116. The IP telephony system 124 then routes the call through mobile telephony service provider B 140 to the subscriber mobile telephony device 112. FIG. 1 also depicts that the IP telephony system 124 may use gateways 120A, 120B to communicate with the PSTN 130, mobile telephony service provider A 114, as well as other telephony service providers.

FIG. 1 further depicts that mobile telephony service provider B 140 is located in country 2 and provides service to mobile telephony devices located in country 2. Mobile telephony service provider B 140 could also be a cellular service provider.

Finally, FIG. 1 illustrates that the subscriber mobile telephony device 112 is located in country 2, and it is capable of wirelessly accessing the Internet 116 via a wireless interface 118. This allows the subscriber mobile telephony device 112 to send and receive data communications over the Internet 116. The wireless interface 118 could be a wireless router operating under the WiFi or WiMax standards, or any other type of wireless interface device that is capable of communicating with the subscriber mobile telephony device 112 and the Internet 116. In other instances, the subscriber mobile telephony device 112 could establish a data link to the Internet, or to some other data network, in other ways. For example, the subscriber mobile telephony device 112 could communicate through a wireless Local Area Network (LAN), a Wide Area Network (WAN) gateway, a hardwired Internet connection and the like.

Although the subscriber mobile telephony device 112 is capable of sending and receiving data communications through the wireless interface 118, the subscriber mobile telephony device 112 is also capable of establishing a data channel through a mobile telephony service provider. The data channel would be separate from a channel used for audio communications. Thus, the subscriber mobile telephony device 112 is capable of sending and receiving data communications via two independent pathways.

As explained above, mobile telephony service provider A 114, located in country 1, is the native service provider for the subscriber mobile telephony device 112. When located in country 2, the subscriber mobile telephony device 112 only has access to mobile telephony service provider B 140 to send and receive telephony communications. This results in the subscriber incurring roaming charges.

As will be described in more detail below, elements of the IP telephony system 124 are capable of terminating telephony communications to the subscriber mobile telephony device 112 via a data connection passing over the Internet 116. In some instances, the IP telephony system 124 may also be capable of terminating telephony communications to the subscriber mobile telephony device 112 via a data connection passing over a data channel provided by mobile telephony service provider B 140. So long as the cost of obtaining that data connection is lower than the cost of receiving a telephone call via mobile telephony service provider B 140 over a mobile voice channel, this may be a preferred way of terminating the telephony communication to the subscriber mobile telephony device 112.

Figure 2:
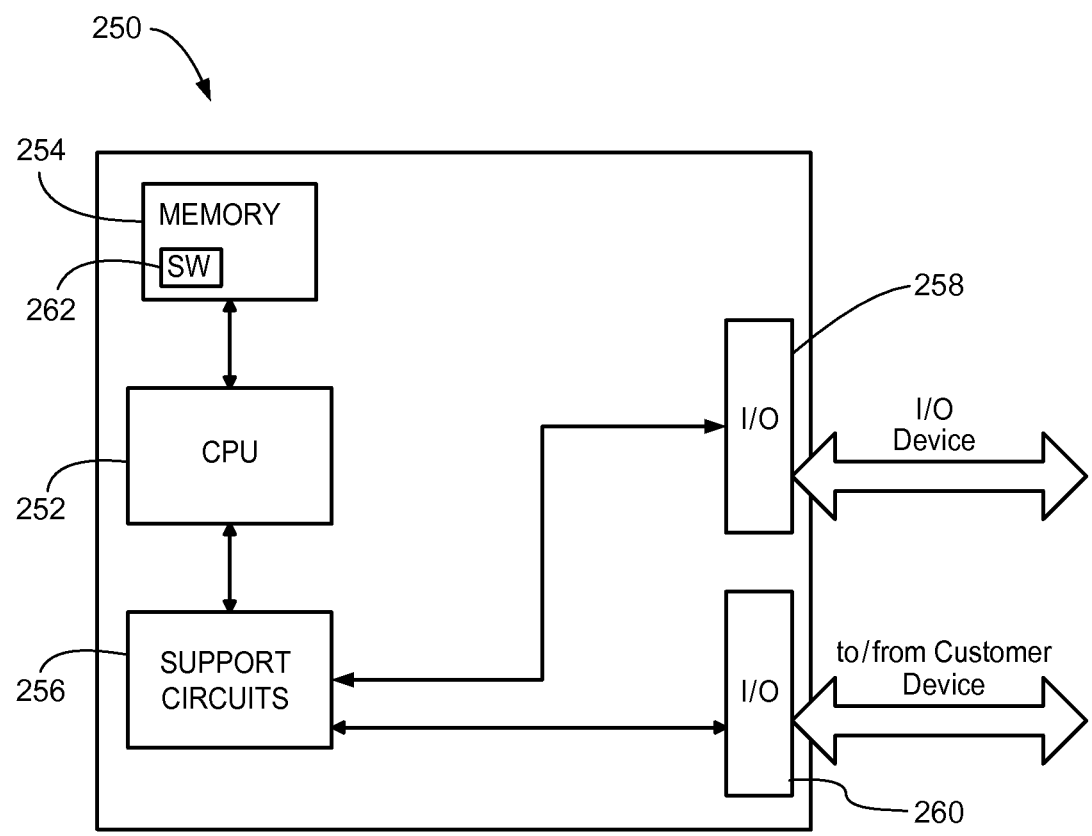
FIG. 2 is a schematic diagram of a controller that may be used to practice one or more embodiments of the present invention.

FIG. 2 illustrates elements of a computer processor 250 that can be used as part of the system operated by the IP telephony service provider 124 to accomplish various functions. The IP telephony service provider 124 could utilize multiple processors 250 located at various locations, along with their operating components and programming, each carrying out a specific or dedicated portion of the functions performed by the IP telephony service provider 124.

The processor 250 shown in FIG. 2 may be one of any form of a general purpose computer processor used in operating an IP based communication system. The processor 250 comprises a central processing unit (CPU) 252, a memory 254, and support circuits 256 for the CPU 252. The processor 250 also includes provisions 258/260 for connecting the processor 250 to customer equipment via one or more access point, such as the packet network 116, gateways 120A, 120B and a data channel provided by a cellular service provider, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

Another form of processor 250 that assists in execution and is otherwise part of the subject invention is found within one or more of the mobile telephony devices. Such devices are sufficiently advanced beyond early generation cellular telephones that they contain processors capable of running operating systems developed by device manufactures, as well as third party applications that are downloaded and installed by users to performing a myriad of communications and non-communications oriented tasks.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 124. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

Figure 3:
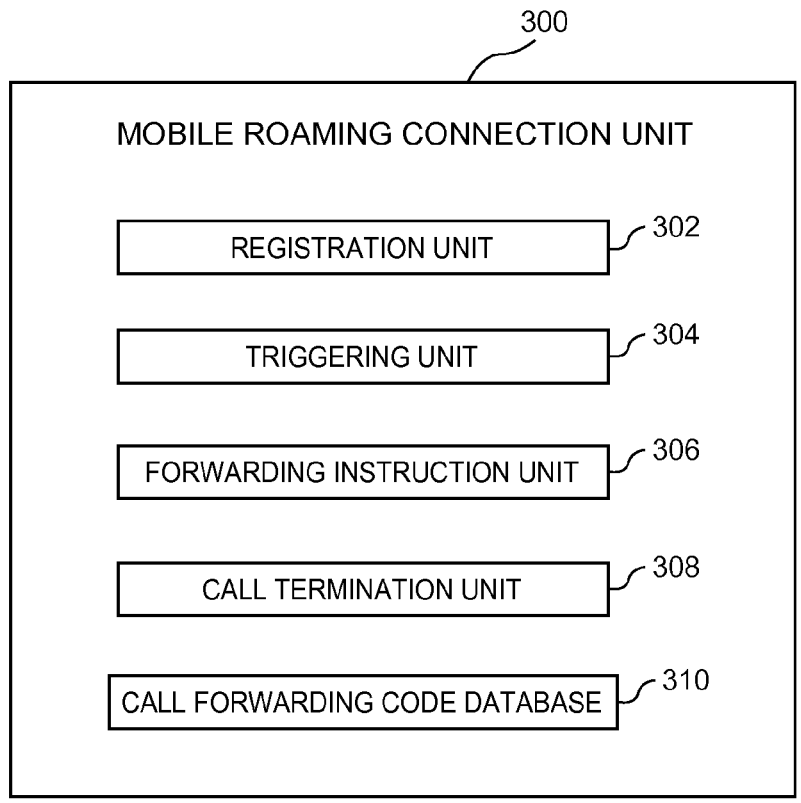
FIG. 3 is a block diagram illustrating elements of a mobile roaming connection unit embodying the invention.

The IP telephony system 124 includes a mobile roaming connection unit 300, as illustrated in FIG. 3. The mobile roaming connection unit 300 includes a registration unit 302, a triggering unit 304, a forwarding instruction unit 306, a call termination unit 308, and an optional call forwarding code database 310. These elements act together to register a mobile telephony device with a mobile roaming termination service provided by the IP telephony system 124. These elements also act to determine when the service should be activated or deactivated, and to route telephony communications to registered mobile telephony devices when they are roaming out of their native service area. Whenever possible, the mobile roaming connection unit 300 terminates telephony communications to a roaming mobile telephony device in a manner that does not result in the user incurring roaming charges.

In some embodiments, any time that the subscriber mobile telephony device 112 detects the availability of a data network connection, such as through the wireless interface 118, the subscriber mobile telephony device 112 contacts the mobile roaming connection unit 300 and registers with same. Once registered, the IP telephony system 124 is capable of routing telephony communications to the subscriber mobile telephony device 112 via the data network connection. In some embodiments, however, the subscriber mobile telephony device 112 may only attempt to register with the mobile roaming connection unit if the subscriber mobile telephony device determines that it is outside of its native service area and is roaming. In still other embodiments, the subscriber mobile telephony device may attempt to register with the mobile roaming connection unit 300 when it is still within its native service area, but when the device is unable to establish a connection to its native mobile telephony service provider.

Also, in some instances, the subscriber mobile telephony device 112 may deliberately choose to register itself with the mobile roaming connection unit 300 when it is within its native service area, and when a cellular channel to mobile telephony service provider A 114 is available. This might allow the subscriber mobile telephony device to receive incoming calls without using up minutes of a calling plan. In this instance, the subscriber might configure his subscriber device 112 such that whenever the subscriber device 112 detects the availability of a data network connection, such as a wireless router 118 connected to the Internet 116, use of the system and methods described above are automatically initiated.

The registration unit 302 will act to register individual mobile telephony devices with the mobile roaming termination service. Typically a subscriber will already have an existing account with the IP telephony system 124. However, in some instances, a subscriber could register for the mobile roaming termination service as its only service from the IP telephony system 124.

Figure 4:
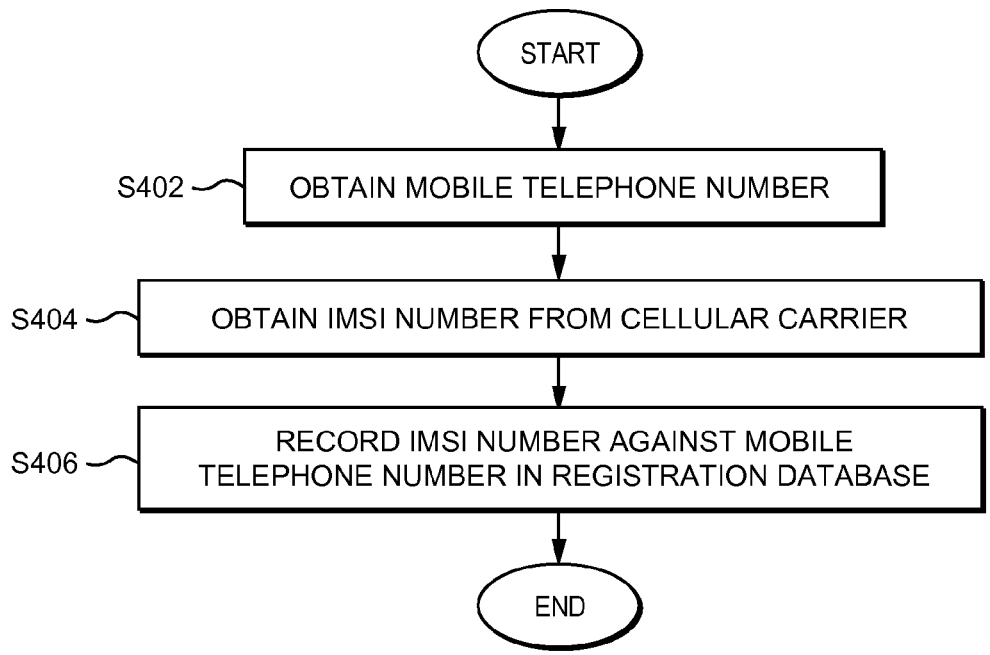
FIG. 4 is a diagram illustrating steps of a method embodying the invention for registering a mobile telephony device with a mobile roaming termination service.

FIG. 4 illustrates steps of a method of registering a mobile telephony device with the mobile roaming termination service. As illustrated in FIG. 4, in step S402, the registration unit 302 obtains the native telephone number associated with the subscriber mobile telephony device 112. This native telephone number may have been assigned by mobile telephony service provider A 114, or by some other mobile telephony service provider. The registration unit 300 then creates a new entry in a registration database for the subscriber mobile telephony device 112 that includes the native telephone number.

In step S404, the registration unit 302 obtains an identifier associated with the subscriber mobile telephony device 112 from mobile telephony service provider A 114. In one embodiment of the invention, the identifier is an international mobile subscriber identity (IMSI) number. The IMSI number is a unique identifier associated with all GSM and UMTS network mobile telephone users and conforms to the ITU E.212 numbering standard.

The IMSI number is actually associated with the SIM card present in the subscriber mobile telephony device 112, and it would be contained in a home location register that is maintained by mobile telephony service provider A 114. The IMSI number is often required to be used in certain communications with a mobile telephony service provider when the mobile service provider is being asked to take certain actions with respect to a mobile telephony device. In step S406, the registration unit 302 stores the IMSI number in the record established for the subscriber mobile telephony device 112 in the registration database.

Once the subscriber mobile telephony device 112 has been registered, the mobile roaming connection unit 300 will have the information it requires to cause telephony communications directed to the regular native telephone number associated with the subscriber mobile telephony device 112 to be re-directed to the IP telephony system 124. This is accomplished by instructing mobile telephony service provider A 114 to forward calls directed to the native telephone number associated with the subscriber mobile telephony device 112 to a new access number that is maintained by the IP telephony system 124. Once call forwarding instructions have been implemented, all calls placed to the subscriber mobile telephony device 112 will instead be received by the IP telephony system 124. In some embodiments, this would be accomplished using the RTP and SIP protocols. The IP telephony system 124 can then terminate the call to the subscriber mobile telephony device 112 in a fashion that will not incur roaming charges.

Figure 5:
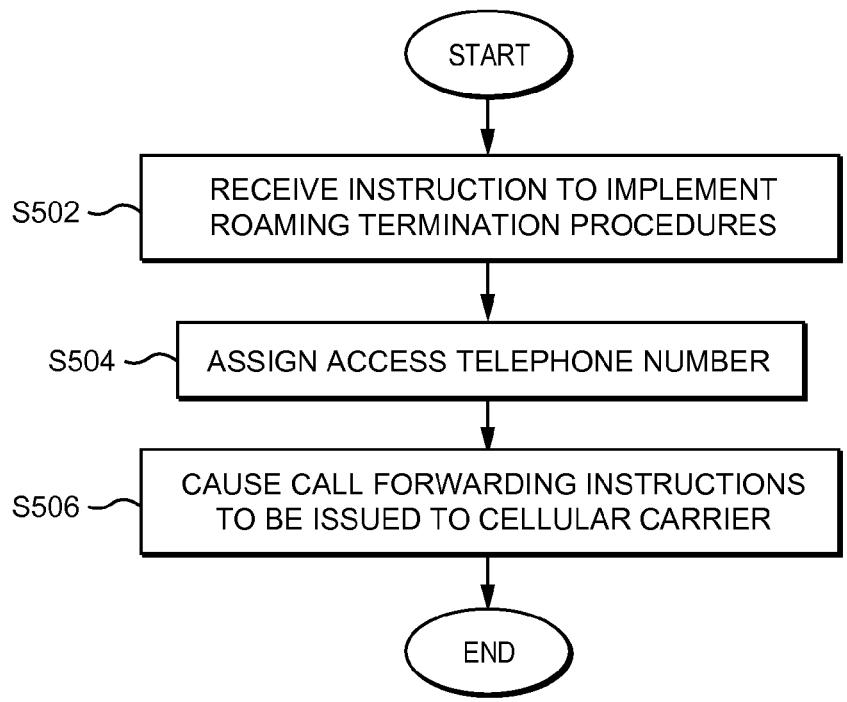
FIG. 5 is a diagram illustrating steps of a method embodying the inventor for implementing call forwarding instructions as part of a method of terminating telephony communications to mobile telephony devices.

FIG. 5 illustrates steps of a method that would be performed by the mobile roaming connection unit 300 to cause the implementation of call forwarding instructions. The method starts in step S502 when the triggering unit 304 of the mobile roaming connection unit 300 decides that forwarding instructions should be issued. The triggering unit 304 determines that it is appropriate to implement call forwarding instructions in response to a variety of different conditions, as will be described in more detail below.

In step S504, the forwarding instruction unit 306 assigns a forwarding access telephone number. The forwarding access telephone number is stored in a registration database maintained by the IP telephony system 124 against the native telephone number and IMSI number of the subscriber mobile telephony device 112. Once the forwarding access number has been assigned, in step S506 the forwarding instruction unit 306 issues call forwarding instructions to mobile telephony service provider A 114 to cause mobile telephony service provider A 114 to forward all calls made to the native telephone number of the subscriber mobile telephony device 112 to the assigned forwarding access number. Typically, the IMSI number for the subscriber mobile telephony device 112 must be used in the communications with mobile telephony service provider A 114 to cause the implementation of the call forwarding instructions.

The forwarding access telephone number is controlled by the IP telephony system 124. Once the call forwarding instructions have been implemented, any calls made to the native telephone number of the subscriber mobile telephony device 112 are received by the IP telephony system 124. Also, when the IP telephony system 124 receives a call directed to a forwarding access telephone number, the IP telephony system 124 consults the registration database to determine which subscriber mobile telephony device is associated with that forwarding access telephone number. In this fashion, the IP telephony system 124 knows which mobile telephony device the caller is trying to reach.

The subscriber mobile telephony device 112 registers itself with the mobile roaming connection unit 300 via communications that pass over a data network. Those communications could be sent to the mobile roaming connection unit 300 over the Internet, via a wireless interface 118. Those communications could also pass over a data channel of a cellular connection. Regardless, the subscriber mobile telephony device 112 would contact the mobile roaming connection unit 300 and provide information, such as an IP address and a port number, that allows the mobile roaming connection unit 300 to contact the subscriber mobile telephony device 112 and establish a voice over Internet protocol link with the subscriber mobile telephony device 112. This information would also be stored in the registration database against the other information being maintained for the subscriber mobile telephony device 112.

Once call forwarding instructions have been issued, and once the subscriber mobile telephony device 112 has registered with the mobile roaming connection unit 300, the mobile roaming connection unit 300 can route incoming calls to the subscriber mobile telephony device 112 through a data network. The mobile roaming connection unit 300 establishes a VOIP call with the subscriber mobile telephony device 112, and that call is then connected to the inbound call forwarded from mobile telephony service provider A 114.

Because the incoming call is routed through the data network, rather than through non-native mobile telephony service provider B 140, no roaming charges will be incurred by the user. The user may have to pay to obtain access to the data network. But in many instances, the cost of accessing the data network will be lower than the cost of roaming charges that would otherwise be incurred. For example, if the subscriber mobile telephony device 112 uses a wireless access point, such as a WiFi router, to obtain access to the data network, the charges for such access would likely be far lower than the cost of roaming charges. Even when the subscriber mobile telephony device 112 uses a cellular data channel to obtain access to a data network, the user would likely incur lower charges for data access than the cost of typical roaming charges.

When the subscriber mobile telephony device 112 registers with the mobile roaming connection unit 300, this event may trigger the forwarding instruction unit 306 to issue call forwarding instructions to mobile telephony service provider A 114. However, a variety of other triggering events might also cause the forwarding instruction unit 306 to issue call forwarding instructions. Also, the triggering events that cause the implementation or cancellation of call forwarding instructions could be customized for an individual user or for an individual subscriber mobile telephony device.

Figure 6:
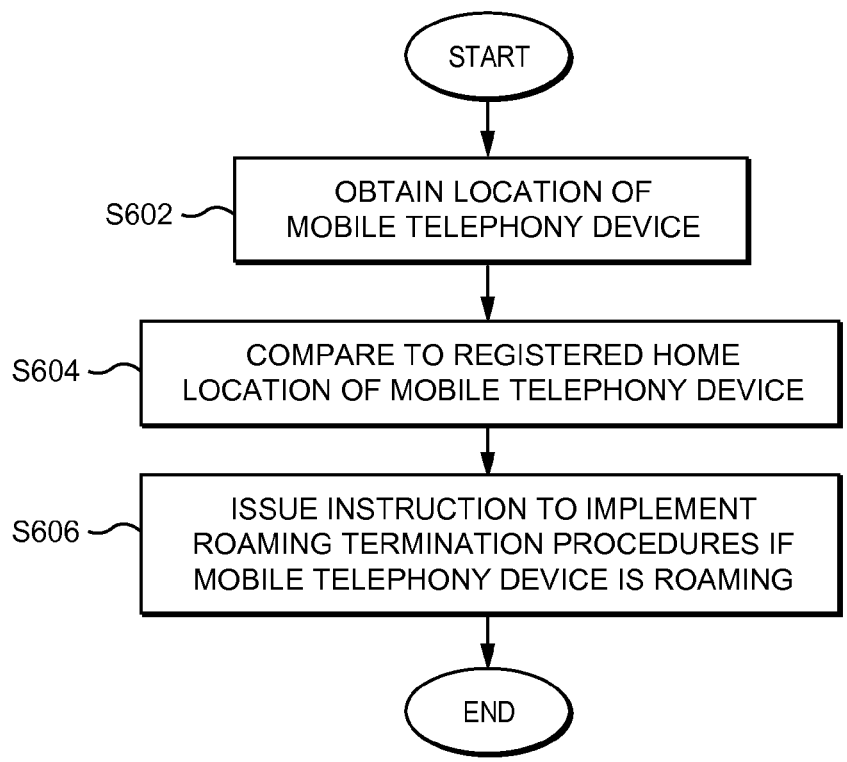
FIG. 6 is a diagram illustrating steps of a method embodying the inventor for triggering the implementation of call forwarding instructions as part of a method of terminating telephony communications to mobile telephony devices.

FIG. 6 illustrates steps of a method that results in call forwarding instructions being issued. The method starts in step S602 when the triggering unit 304 of the mobile roaming connection unit 300 obtains information about the location of the subscriber mobile telephony device 112. This could be accomplished by having the triggering unit 304 interrogate the subscriber mobile telephony device 112 to obtain location information. Alternatively, an application running on the subscriber mobile telephony device 112 may periodically report the position of the subscriber mobile telephony device to the triggering unit 304.

In step S604, the triggering unit 304 compares the location of the subscriber mobile telephony device 112 to the known native service area of the device to determine if the subscriber mobile telephony device 112 has roamed out of its native service area. If the subscriber mobile telephony device 112 is roaming, then in step S606, the triggering unit issues forwarding instructions to mobile telephony service provider A 114 to have calls placed to the native telephone number of the subscriber mobile telephony device 112 forwarded to a forwarding access number, as described above. A similar process would be used to cancel call forwarding instructions when the triggering unit 304 determines that the subscriber mobile telephony device has returned to its native service area.

In alternate embodiments, the triggering unit 304 of the mobile roaming connection unit 300 may monitor the movements of the subscriber mobile telephony device 112 over an extended period of time. If an analysis of the movements of the subscriber mobile telephony device indicate that the device travels outside its native service area according to a regular pattern, such as every Monday morning, and/or that the device travels back into its native service area according to a regular pattern, such as every Friday evening, then this pattern information may be used to trigger the implementation and cancellation of call forwarding instructions. Rather than waiting for the actual location of the subscriber mobile telephony device to be obtained or reported, forwarding instructions may be automatically implemented and canceled based on the predicted movements of the device.

In the methods discussed above, the forwarding instruction unit 306 acts to automatically implement and cancel call forwarding instructions based on the occurrence of an event, or based on a prediction. Likewise, an application running on the subscriber mobile telephony device may itself automatically cause the implementation and cancellation of call forwarding instructions if the application detects that the device has moved out of or back into the subscriber's native calling area. The application may also automatically cause the implementation and cancellation of call forwarding instructions when the application detects that the subscriber mobile telephony device 112 does not have a cellular connection to its native mobile telephony service provider A 114. Similarly, the application may automatically cause the implementation and cancellation of call forwarding instructions when the application detects that a data network connection is available.

Also, the user might take direct actions to cause the implementation and cancellation of call forwarding instructions. For example, an application running on the subscriber mobile telephony device may provide a user with the ability to manually cause the implementation and cancellation of call forwarding instructions.

When an application running on the subscriber mobile telephony device 112 is causing the implementation of call forwarding instructions, the application may be directly communicating with the mobile telephony service provider, or the application may communicate with the mobile roaming connection unit 300 to request that it cause the implementation or cancellation of call forwarding instructions. If the application is directly interacting with the mobile telephony service provider, the application may contact the mobile roaming connection unit 300 via a data network connection to obtain a forwarding access number. Such communications would also inform the mobile roaming connection unit 300 that calls received on the forwarding access number should be terminated to the subscriber mobile telephony device 112. Examples of such embodiments are discussed in more detail below.

In another embodiment of the invention, all incoming telephony communications are forwarded to the IP telephony system 124 at all times. This would require that a dedicated forwarding access number be assigned to the subscriber mobile telephony device 112, and call forwarding instructions would always be active. Each time that a call is received on the forwarding access number, the mobile roaming connection unit 300 checks the connection status of the subscriber mobile telephony device 112 to determine what type of access the subscriber mobile telephony device 112 has. The call is then terminated to the subscriber mobile telephony device 112 in the most appropriate manner. This could mean sending the call through a cellular service provider in a normal manner, or setting up a VOIP telephone link via a data network. If more than one connection method is possible, preference rules would determine how the call is connected.

If there is no such access, the incoming telephony communication could be sent to voicemail, or to some type of interactive voice response system. Alternatively, the incoming telephony communication could be forwarded to another subscriber device or telephone number.

Figure 7:
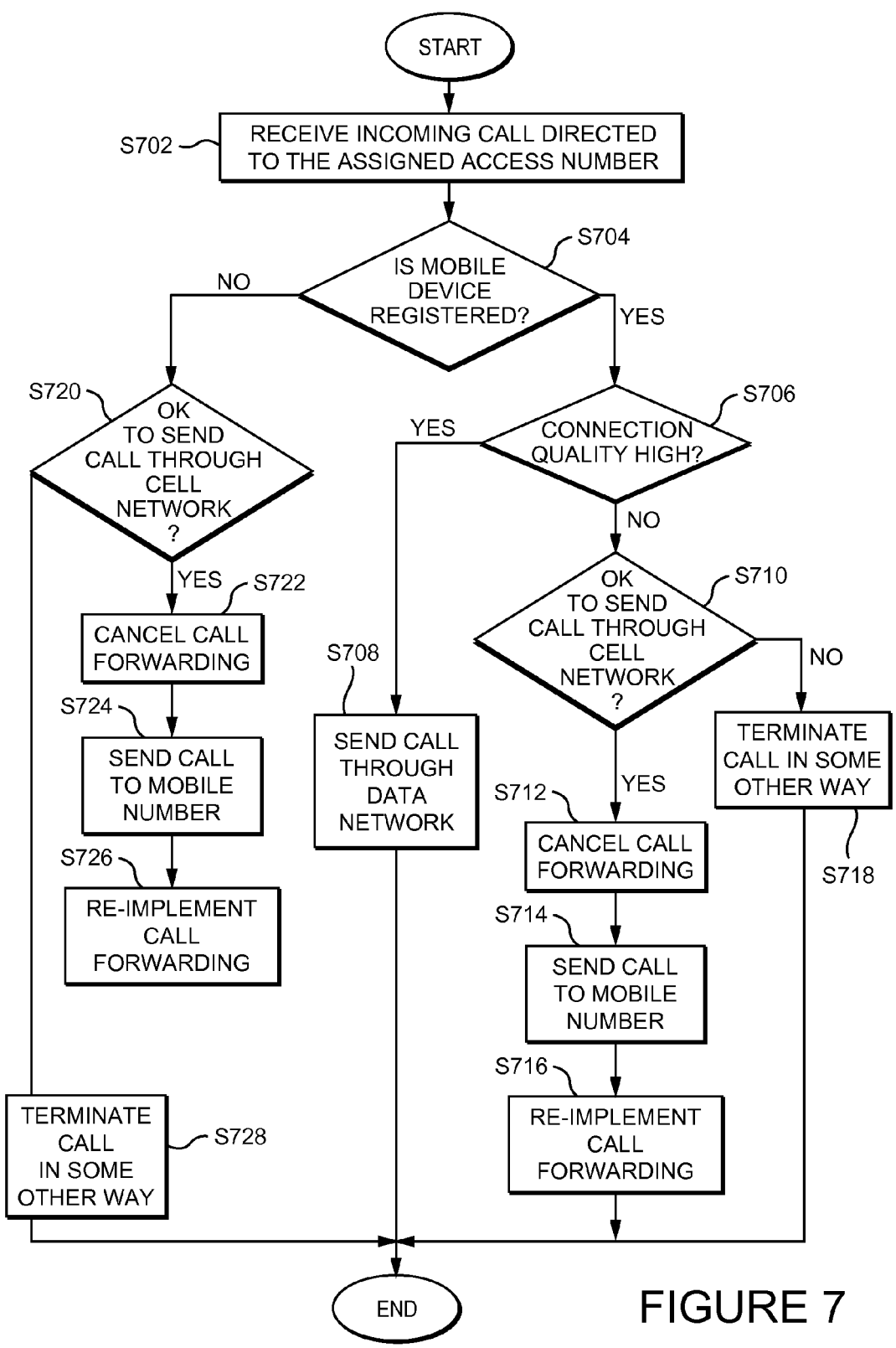
FIG. 7 is a diagram illustrating steps of a method embodying the inventor for terminating telephony communications to a mobile telephony device.

FIG. 7 illustrates steps of a control method embodying the invention which terminates incoming telephony communications to a subscriber mobile telephony device 112 via the most appropriate path. This method would be executed by the mobile roaming connection unit 300 of an IP telephony system 124 after call forwarding instructions have been implemented. For purposes of the following explanation, the subscriber mobile telephony device 112 is located in country 2 (see FIG. 1), and the subscriber mobile telephony device is capable of receiving incoming telephony communications from mobile telephony service provider B 140.

The method begins in step S702 when an incoming telephony communication is received on a forwarding access number that has been assigned for the subscriber mobile telephony device 112. In step S704, the call termination unit 308 of the mobile roaming connection unit 300 checks to determine if the subscriber mobile telephony device 112 is registered and reachable via a data network connection. If the subscriber mobile telephony device 112 is registered, in step S706 the call termination unit 308 checks to determine the quality of the data connection. If the data connection is capable of supporting a VOIP call to the subscriber mobile telephony device 112, then in step S708 a VOIP call is established between the IP telephony system 124 and the subscriber mobile telephony device 112 over the data network. The received telephony communication is then terminated to the subscriber mobile telephony device 112 through the VOIP call.

If the quality of the data network connection to the subscriber mobile telephony device 112 is not sufficient, then in step S710 a check is made to determine if the user has authorized calls to be terminated to the subscriber mobile telephony device 112 through non-native mobile telephony service provider B 140. This will likely result in roaming charges. However, the user may choose to accept the roaming charges if there is no other way of receiving an incoming telephony communication. In this scenario, the mobile roaming connection unit 300 first checks to see if it is possible to terminate the call through alternate means. But if no other means are available, the call is ultimately terminated through the non-native mobile telephony service provider B 140, after call forwarding has been canceled.

The result of the decision reached in step S710 could be conditioned on various things. For instance, the user may have instructed that all calls be terminated through non-native mobile telephony service provider B 140 if no other method of terminating the call exists. In other instances, the user might specify that calls should only be terminated through a non-native telephony service provider if the call will cost less than a threshold amount to complete. In still other instances, the user might specify that only calls originating from a particular set of telephone numbers should be completed through a non-native mobile telephony service provider. This would allow the user to specify that certain important people be put through, but that other calls are not.

If the decision in step S710 is that the call should not be terminated through a non-native mobile telephony service provider, then in step S718 the call is terminated in some other fashion. As discussed above, this could include sending the call to voicemail, playing a recording to the caller that the called party is unavailable, forwarding the call to an alternate telephone number, or terminating the call in some other fashion.

If the decision in step S710 is to terminate the call to the subscriber mobile telephony device 112 through non-native mobile telephony service provider B 140, in step S712 the forwarding instruction unit 306 contacts mobile telephony service provider A 114 and cancels the call forwarding instructions. The call termination unit 308 then sends the call to the regular native telephone number of the subscriber mobile telephony device 112 in step S714. This will cause mobile telephony service provider A 114 to send the call on to mobile telephony service provider B 140, which ultimately completes the call to the subscriber mobile telephony device 112.

Because the call is being routed through the IP telephony system 124, the mobile roaming connection unit 300 is able to monitor the status of the call. Once the call is completed, the method proceeds to step S716, where the call forwarding instructions are re-implemented. This ensures that further calls directed to the subscriber mobile telephony device 112 will be forwarded to the IP telephony system 124.

If the check made in step S704 indicated that the subscriber mobile telephony device 112 is not registered with the mobile roaming connection unit 300, then in step S720 a check is made to determine if it is acceptable to terminate the communication through the non-native mobile telephony service provider B 140. If the system determines that the call should not be terminated through non-native mobile telephony service provider B 140, then in step S728 the call would be terminated in some other fashion.

If the decision in step S720 is to terminate the call to the subscriber mobile telephony device 112 through a non-native mobile telephony service provider, then in step S722 the forwarding instruction unit 306 contacts mobile telephony service provider A 114 and cancels the call forwarding instructions. The call termination unit 308 then sends the call to the regular native telephone number of the subscriber mobile telephony device 112 in step S724. This will cause mobile telephony service provider A 114 to send the call on to mobile telephony service provider B 140, which ultimately completes the call to the subscriber mobile telephony device 112. Once the call is completed, the method proceeds to step S726, where the call forwarding instructions are re-implemented.

Figure 8:
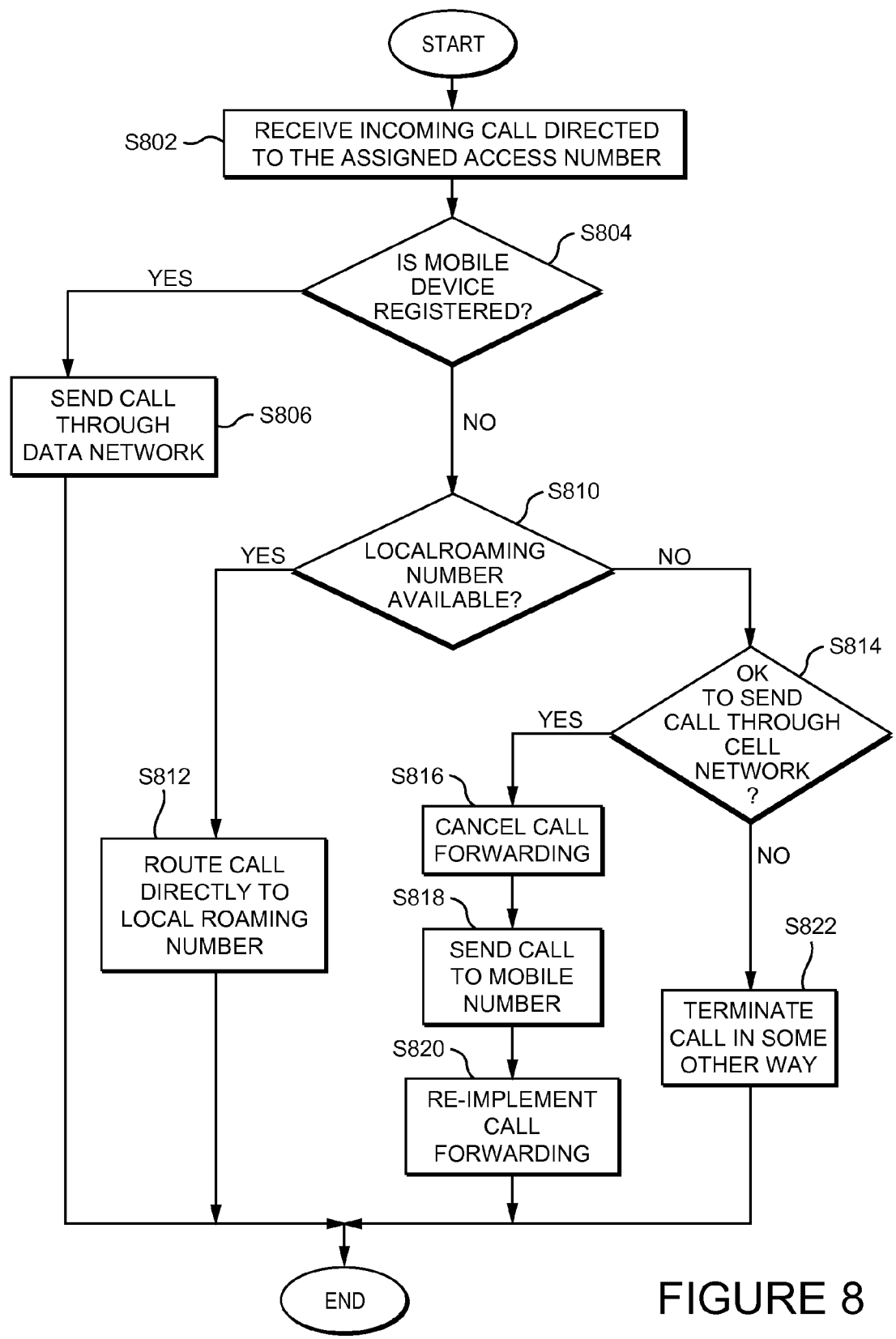
FIG. 8 is a diagram illustrating steps of another method embodying the invention for terminating telephony communications to a mobile telephony device.

FIG. 8 illustrates steps of another method embodying the invention. This method results in a telephony communication being terminated to a subscriber mobile telephony device 112 that is roaming. The call is completed through the non-native mobile telephony service provider B 140. However, the call is completed in a fashion that will not result in roaming charges.

When a mobile telephony device is located outside of its native calling area, the device will communicate with a non-native mobile telephony service provider. During an initial communication process, the non-native mobile telephony service provider will recognize that the mobile telephony device is a non-native device. As a result, the non-native mobile telephony service provider will assign a temporary local access telephone number to the device. The temporary number is often known as a mobile subscriber roaming number (MSRN). The non-native mobile telephony service provider then communicates with the user's native mobile telephony service provider and informs the native mobile telephony service provider of the assigned local access telephone number. This can be accomplished using a MAP Update Location Message.

The native mobile telephony service provider stores the temporary local access telephone number in a home location register that it maintains. The native mobile telephony service provider can obtain the temporary local access telephone number using a MAP Provide Roaming Number message. Whenever a call comes in for the subscriber's mobile telephony device, the native mobile telephony service provider forwards the call to the temporary local access telephone number. This will route the call to the non-native mobile telephony service provider, which then completes the call to the subscriber's mobile telephony device.

Because the local access number assigned to the subscriber mobile telephony device 112 by the non-native mobile telephony service provider B 140 is stored in the home location register of the native mobile telephony service provider A 114, this information may be available to the IP telephony system 124. For purposes of the following explanation, the subscriber mobile telephony device 112 is roaming in country 2, and mobile telephony service provider B 140 has assigned a local access number to the subscriber mobile telephony device 112. The mobile roaming connection unit 300 has obtained the local access number from the native mobile telephony service provider 114. Finally, forwarding instructions for the subscriber mobile telephony device have been implemented.

The method begins in step S802, when an incoming telephony communication directed to the subscriber mobile telephony device 112 is received by the IP telephony system 124. In step S804 a check is performed to determine if the subscriber mobile telephony device 112 is registered with the mobile roaming connection unit 300 and available over a data connection. If so, then in step S806 the call is completed to the subscriber mobile telephony device 112 over the data connection.

If the subscriber mobile telephony device is not available over a data connection, the method proceeds to step S810, where a check is performed to determine if the mobile roaming connection unit 300 has the local access number assigned by the non-native mobile telephony service provider B 140. If the local access number is available, in step S812 the mobile roaming connection unit 300 routes the call over a data network to a gateway located in country 2. The gateway in country 2 then contacts and hands the call off to the non-native mobile telephony service provider B 140. The non-native mobile telephony service provider B 140 then completes the call to the subscriber mobile telephony device 112.

The IP telephony system 124 already has multiple agreements in place with mobile telephony service providers in multiple countries. Those agreements allow the IP telephony system 124 to route calls over a data network to gateways located in various countries. Those gateways can then hand calls off to the mobile telephony service providers in those countries.

By routing the call over the data network until the call arrives in the desired country, and by having the non-native mobile telephony service provider then complete the call from a local gateway to the subscriber mobile telephony device 112, the call can be completed for a considerably lower cost than if the call was handled in a traditional manner, and roaming charges were incurred. The user would likely have to pay a small charge to terminate the call in this fashion. But the charge would be less than the cost of the roaming charges.

Returning now to FIG. 8, if the local access number is not available, in step S814 a check is made to determine if it is acceptable to terminate the communication in the traditional manner through the non-native mobile telephony service provider B 140. If the system determines that the call should not be terminated through the non-native mobile telephony service provider B 140, then in step S822 the call would be terminated in some other fashion.

If the decision in step S814 is to terminate the call to the subscriber mobile telephony device 112 in the traditional manner through the non-native mobile telephony service provider B 140, then in step S816 the forwarding instruction unit 306 contacts mobile telephony service provider A 114 and cancels the call forwarding instructions. The call termination unit 308 then sends the call to the regular native telephone number of the subscriber mobile telephony device 112 in step S818. This will cause mobile telephony service provider A 114 to send the call on to mobile telephony service provider B 140, which ultimately completes the call to the subscriber mobile telephony device 112. Once the call is completed, the method proceeds to step S820, where the call forwarding instructions are re-implemented.

As an additional feature of the call termination processes presented above, an enhanced security option is made available. That is, once a communication request is passed to the IP telephony system 124, call signaling and media connections between the IP telephony system 124 and the subscriber mobile telephony device 112 may be encrypted to provide a secure communication session. The encryption techniques that are used could be RSA encryption, as described in PKCS#1 v2.1: RSA Cryptography Standard, RSA Laboratories, dated Jun. 14, 2002, or AES encryption as described in Advanced Encryption Standard (AES), Federal Information Processing Standards Publication 197, dated Nov. 26, 2001, or the techniques described in Secure Socket Layer (now Transport Layer Security) Protocol, Version 1.2 as described in IETF RFC 5246, dated August 2008, all of which are incorporated herein by reference.

In the methods described above, a call forwarding number is assigned by the mobile roaming connection unit 300 when call forwarding instructions are being implemented. This would likely result in different forwarding access telephone numbers being used for the same device at different times. However, in other embodiments, the forwarding access telephone number could be a dedicated telephone number that is used only for a particular mobile telephony device.

In the systems and methods described above, a forwarding instruction unit 306 of a mobile roaming connection unit 300 assigns a forwarding access telephone number and issues call forwarding instructions to mobile telephony service provider A 114. This causes mobile telephone service provider A 114 to forward all calls made to the native telephone number of the subscriber mobile telephony device 112 to be forwarded to the assigned forwarding access number.

In some cases, it may be impossible for the forwarding instruction unit 306 of a mobile roaming connection unit 300 to interact directly with a mobile telephony service provider to cause the mobile telephony service provider to implement and/or cancel call forwarding instructions. In those cases, however, it may be possible for call forwarding instructions to be implemented and canceled by issuing such instructions to the mobile telephony service provider from a subscriber's mobile telephony device. As will be explained below, in some embodiments, a software application running on a subscriber's mobile telephony device can cause call forwarding instructions to be issued from the subscriber's mobile telephony device. In other embodiments, the subscriber may need to take some type of positive action to cause appropriate call forwarding instructions to be issued from the subscriber's mobile telephony device.

Instructions to implement and cancel call forwarding can be issued to a mobile telephony service provider from a subscriber's mobile telephony device by dialing predetermined patterns of characters and/or numbers. The call forwarding activation and deactivation codes can vary from one mobile telephony service provider to the next. Thus, it is important to know which mobile telephony service provider is providing the native service to a subscriber's mobile telephony device to thereby know which string of characters must be dialed implement or cancel call forwarding instructions.

Also, many mobile telephony service providers allow for different types of call forwarding instructions. Some call forwarding instructions can be unconditional, whereas other call forwarding instructions can be conditional based on various factors. For example, in many mobile telephony systems a first call forwarding activation code causes all calls placed to the native telephone number of a subscriber's mobile telephony device to be forwarded to a specified forwarding telephone number. A second call forwarding activation code causes a call placed to the native telephone number of a subscriber's mobile telephony device to be forwarded to a specified forwarding telephone number only if the subscriber's mobile telephony device is already busy with another call. A third call forwarding activation code causes calls to the native telephone number of a subscriber's mobile telephony device to be forwarded to a forwarding telephone number only if the call is not answered by the subscriber's mobile telephony device within a certain period of time after ringing begins.

As with the call forwarding activation codes, different deactivation codes may be required to deactivate each of these different types of call forwarding instructions. The deactivation codes may also vary from one mobile telephony service provider to the next.

Most subscribers are not aware of the codes that must be dialed on their mobile telephony device to activate and deactivate call forwarding. Also, in many systems and methods embodying the invention, the call forwarding number that is assigned by the mobile roaming connection unit 300 will not be known until it is actually issued by the mobile roaming connection unit 300. And that may not occur until the subscriber's mobile telephony device registers with the mobile roaming connection unit 300 via a data connection.

For these reasons, if it is necessary for a subscriber to issue call forwarding instructions to the mobile telephony service provider by dialing a particular string of characters on the subscriber's mobile telephony device, it is helpful for the mobile roaming connection unit 300 to provide the subscriber, or an application on the subscriber's mobile telephony device, with the string of characters that must be dialed. Several different ways of accomplishing this task are explained below.

In many mobile telephony systems, a subscriber can cause unconditional call forwarding to be implemented by dialing the string "*21*[forwarding telephone number]#". The forwarding telephone number is the telephone number to which calls will be forwarded. In the United States, the forwarding telephone number typically includes 10 digits, including the area code and the assigned telephone number. Once unconditional call forwarding instructions have been implemented, they can be canceled by dialing the string "##21#".

In many of those same mobile telephony systems, several different types of conditional call forwarding can be implemented by dialing different strings of characters. For example, some telephony systems can be instructed to forward a call to a forwarding telephone number if the subscriber's mobile telephony device is busy with another call by dialing the character string "*67*[forwarding telephone number]#". This type of conditional call forwarding can be canceled by dialing the character string "##67#". Other types of conditional call forwarding can be implemented and canceled by dialing other character strings.

In the context of this invention, the point of issuing call forwarding instructions is to cause a subscriber's native mobile telephony service provider to forward an incoming call directed to the native telephone number of the subscriber's mobile telephony device to be forwarded to a forwarding access number that has been assigned by a mobile roaming connection unit 300 of an IP telephony system 124. Once the incoming call is re-directed to the forwarding access number, the IP telephony system 124 completes the call to the subscriber's mobile telephony device over a data connection. This requires that the subscriber's mobile telephony device already be registered with the mobile roaming connection unit 300 via a data connection.

If the forwarding instruction unit 306 of a mobile roaming connection unit 300 is unable to interact directly with the subscriber's native mobile telephony service provider to cause the implementation and cancellation of call forwarding instructions, then it would be advantageous for such call forwarding instructions to be issued by dialing the appropriate character string from the subscriber's mobile telephony device. Typically, the call forwarding instructions would be issued from the subscriber's mobile telephony device shortly after the subscriber's mobile telephony device registers with a registration unit 302 of the mobile roaming connection unit 300. If a forwarding access telephone number is selected upon registration, this is the earliest point in time at which the forwarding access telephone number will be known.

In the following example, the mobile roaming connection unit 300 provides the subscriber, or an application on the subscriber's mobile telephony device, with a character string that must be dialed from the subscriber's mobile telephony device to implement appropriate call forwarding instructions. In some instances, the subscriber then causes that character string to be dialed to implement the call forwarding instruction. In other instances, an application on the subscriber's mobile telephony device causes the character string to be dialed to implement the call forwarding instructions.

Figure 9:
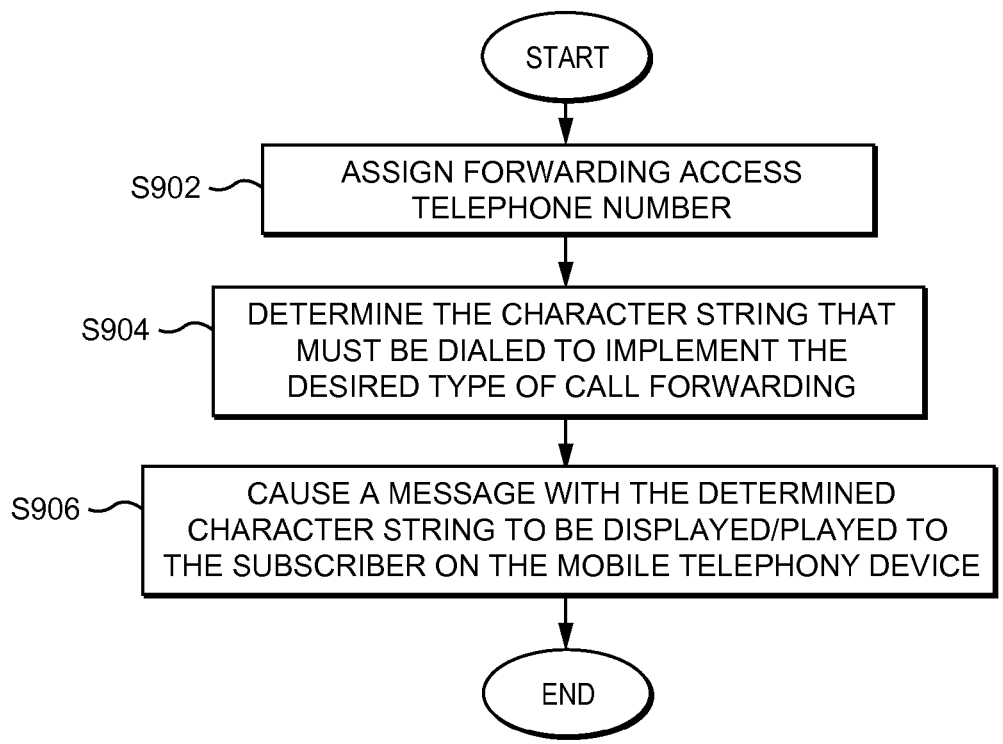
FIG. 9 is a flowchart describing a method in which a character string that can be dialed to implement call forwarding is determined and provided to a telephony device.

FIG. 9 illustrates steps of a method that would be performed when a subscriber's mobile telephony device registers with a mobile roaming connection unit 300 to implement mobile roaming procedures by dialing a character string from the subscriber's mobile telephony device. As explained above, in some embodiments, the subscriber's mobile telephony device automatically contacts the mobile roaming connection unit 300 whenever it is able to establish a data connection, regardless of how that connection is established. In other instances, the subscriber takes direct action to cause his mobile telephony device to register with the mobile roaming connection unit 300. In still other instances, the mobile roaming connection unit may initiate contact to the subscriber's mobile telephony device to cause registration to occur.

The method begins in step S902, where the forwarding instruction unit 306 assigns a forwarding access telephone number for the subscriber's mobile telephony device. As explained above, the forwarding access telephone number is stored in a registration database maintained by the IP telephony system 124 against the native telephone number and the IMSI number of the subscriber's mobile telephony device.

Once the forwarding access number is assigned, in step S904 the forwarding instruction unit 306 determines the string of characters which must be dialed from the subscriber's mobile telephony device to instruct the subscriber's native mobile telephony service provider to implement the desired type of call forwarding.

As explained above, different codes are used by different mobile telephony service providers to implement and cancel the same type of call forwarding instructions. Thus, the forwarding instruction unit 306 needs to know what mobile telephony service provider is providing the native mobile telephony service to the subscriber's telephony device so that the correct character string can be determined. In some embodiments, a call forwarding code database 310 containing the codes or character strings that are used by various different mobile telephony service providers to implement and cancel various different types of call forwarding is part of the mobile roaming connection unit 300, or part of the IP telephony system 124. The call forwarding instruction unit would consult this database to obtain information about how to determined the correct character string.

As also explained above, many mobile telephony service providers are capable of implementing multiple different types of call forwarding, each of which is implemented and canceled by different character strings. Thus, the forwarding instruction unit 306 also needs to determine what type of call forwarding the subscriber wishes to implement, and then determine the character string to use to implement the desired type of call forwarding within the subscriber's mobile telephony service provider system.

In some embodiments, the subscriber's preferences about the type of call forwarding will already have been provided to the mobile roaming connection unit 300 during a registration process. In other instances, the subscriber may be queried about the type of call forwarding he would like to implement each time that the subscriber's mobile telephony device registers with the mobile roaming connection unit 300. In some embodiments, if the subscriber has not made a selection regarding the type of call forwarding instructions he wishes to implement, the mobile roaming connection unit 300 selects a default type of call forwarding, such as unconditional call forwarding.

Once the forwarding instruction unit 306 has determined the character string that must be dialed to implement the desired type of call forwarding to the assigned forwarding access number, in step S906, the forwarding instruction unit 306 provides the determined character string to the subscriber and/or to the subscriber's mobile telephony device in any one of multiple different ways. In some embodiments, the forwarding instruction unit 306 causes a message to be displayed on the subscriber's mobile telephony device. The message includes the determined character string. The message may also include instructions for dialing the determined character string.

In some embodiments, the message could be sent to a software application that is running on the subscriber's mobile telephony device, or that is present on a memory card or SIM card of the device, and which is in communication with the forwarding instruction unit 306 via a data connection. The software application then causes the message to be displayed on the subscriber's mobile telephony device. In other embodiments, the forwarding instruction unit 306 could cause a SMS or MMS message to be sent to the subscriber's mobile telephony device via a telephony system connection. In still other embodiments, a push notification service could be used to send the desired message to the user's mobile telephony device.

In the example given above, the character string "*21*[forwarding telephone number]#" is used to implement unconditional call forwarding to the forwarding telephone number. If the forwarding access number assigned by the forwarding instruction unit 306 is 703.555.1234, the message sent to the subscriber's mobile telephony device would include the string "*21*7035551234#". The subscriber would dial that character string from his mobile telephony device to implement call forwarding to the telephone number 703.555.1234.

In some instances, it may be relatively easy for the subscriber to copy the provided character string, and to then insert that copied character string into the native telephone dialer of the subscriber's mobile telephony device. In other instances, the subscriber's mobile telephony device may have functionality that allows the subscriber to highlight or select the character string in the displayed message, and to then cause the mobile telephony device to dial the highlighted/selected character string. In such instances, it will be relatively easy for the subscriber to cause his mobile telephony device to dial provided character string to cause the implementation of call forwarding instructions.

One type of call forwarding activation code causes calls to the native telephone number of a subscriber's mobile telephony device to be forwarded to a forwarding telephone number if the call is declined by the subscriber (e.g., by pressing decline when the call is first received by the mobile telephony device and the mobile telephony device begins ringing). This fourth type of call forwarding activation code may be advantageous in allowing the subscriber to choose how an incoming call is ultimately connected to his mobile telephony device.

For example, in some instances, a subscriber may find that he experiences superior call quality using a cellular telephony channel, as opposed to a data channel. Thus, depending upon the nature of the phone call, the user may prefer that an incoming call be connected to his mobile telephony device via a cellular telephony channel, which would incur roaming charges, as opposed to receiving the call through a data network via an assigned call forwarding number.

If conditional call forwarding instruction are issued to the subscriber's native mobile telephony service provider that only result in a call being forward to a forwarding access number if the subscriber declines an incoming call, the subscriber will be able to choose how the call is connected to his mobile telephony device. If the subscriber simply answers an incoming telephone call when his mobile telephony device begins to ring, the call will be connected to the subscriber's mobile telephony device via a roaming cellular connection, which might provide higher call quality. On the other hand, if the subscriber declines the call, the subscriber's native mobile telephony service provider will forward the call to a forwarding access number assigned by the mobile roaming connection unit, and the call will be routed to the subscriber's mobile telephony device via a data connection, as described above.

Figure 10:
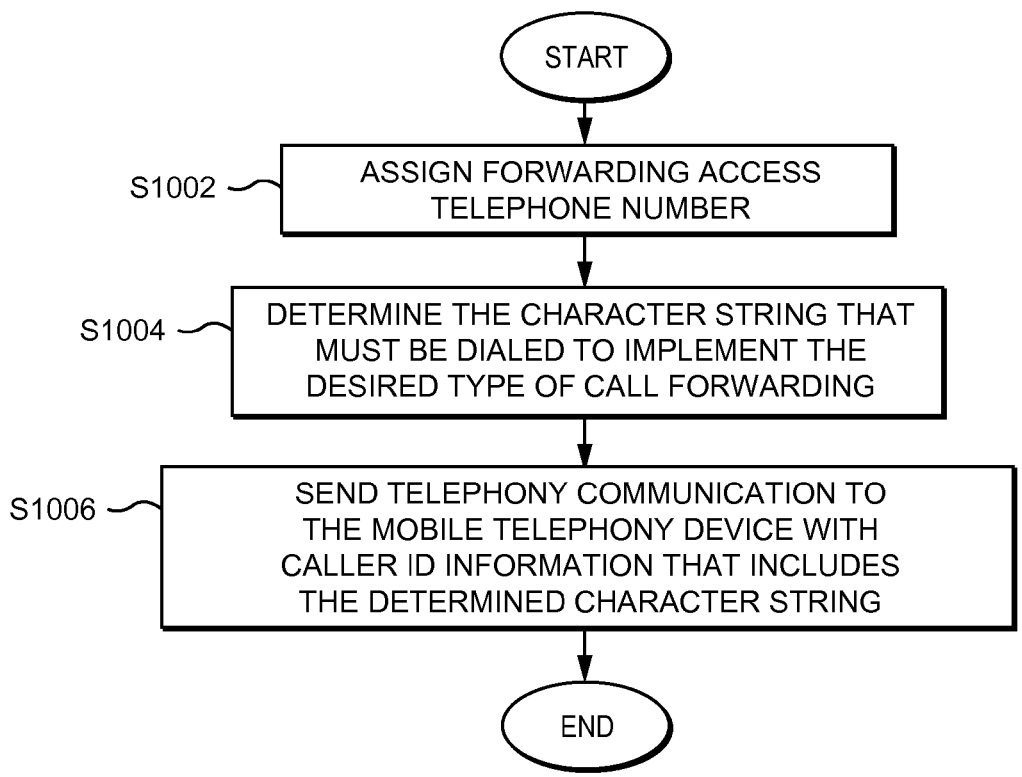
FIG. 10 is a flowchart describing another method in which in which a character string that can be dialed to implement call forwarding is determined and provided to a telephony device.

FIG. 10 illustrates a method in which the forwarding instruction unit 306 sends a character string that is to be used to implement call forwarding to a subscriber's mobile telephony device in a way that makes it easy for the subscriber to dial the provided string. In step S1002, the forwarding instruction unit 306 assigns a forwarding access telephone number. Once the forwarding access telephone number is assigned, the forwarding instruction unit 306 determines the character string that must be dialed from the subscriber's mobile telephony device to implement a desired type of call forwarding to the assigned forwarding access number in step S1004. In step S1006, the forwarding instruction unit 306 provides the character string to the subscriber's mobile telephony device in a manner that allows the character string to be recorded as part of a contact in a contact list that is present on the subscriber's mobile telephony device.

In some embodiments, the forwarding instruction unit 306 causes a telephone call or a SMS/MMS message to be sent to the subscriber's mobile telephony device. The call or SMS/MMS message includes user ID information. The user ID information includes the determined character string as the "telephone number" of the calling party. The name provided in the caller ID information could provide an indication of the function of the character string. For example, the name in the caller ID information could read "Implement Call Forwarding for Mobile Roaming."

When the call or message is received by the subscriber's mobile telephony device, the caller ID information that includes the determined character string, and possibly a label indicating the purpose of the character string, will be recorded in the incoming call log of the subscriber's mobile telephony device. Many mobile telephony devices provide the subscriber with the ability to use the caller ID information that has been captured for an incoming telephony communication to populate a new contact entry in a contact list that is stored on the subscriber's mobile telephony device. Thus, the subscriber is able to store a new contact in his contact list that includes the character string that must be dialed to implement call forwarding as the "telephone number" of the new contact. Likewise, the name in the caller ID information, which can include a label indicating the purpose of the character string, will appear as the name of the new contact.

Once the new contact has been stored on the subscriber's mobile telephony device, the subscriber can request that a call be placed to that contact. This would cause the subscriber's mobile telephony device to dial the character string which implements the required type of call forwarding.

The forwarding instruction unit 306 could also place multiple calls or send multiple messages to the subscriber's mobile telephony device to deliver character strings and corresponding labels for multiple different types of call forwarding instructions. For example, the forwarding instruction unit 306 could place a first call to the subscriber's mobile telephony device with a character string used to implement unconditional call forwarding to an assigned forwarding access number. The subscriber would cause this first character string to be stored as part of a first new contact under the name "Implement Unconditional Call Forwarding." The forwarding instruction unit 306 could then place a second call to the subscriber's mobile telephony device with the character string used to implement a type of conditional call forwarding to the assigned forwarding access number which occurs only if the subscriber's mobile telephony device is busy, or if the subscriber declines an incoming call. The subscriber would cause this second character string to be stored as part of a second new contact under the name "Implement Conditional Call Forwarding." The subscriber could then choose which type of call forwarding is to be implemented by placing a call to the contact which causes the desired type of call forwarding instructions to be implemented.

In the same way that a character string can be stored as a contact that is used to implement a desired form of call forwarding, a contact with a character string that is dialed to cancel call forwarding could also be stored on the subscriber's mobile telephony device under a name such as "Cancel Call Forwarding." As noted above, in some mobile telephony service provider systems, the character string "##21#" can be dialed from a mobile telephony device to cancel unconditional call forwarding. Thus, the forwarding instruction unit 306 could send a call or a message to the subscriber's mobile telephony device that includes caller ID information including the character string "##21#" as the source telephone number, and "Cancel Unconditional Call Forwarding" as the name. The subscriber could then create a new contact with this information. And once created, the subscriber could simply request that a call be placed to the contact with the name "Cancel Unconditional Call Forwarding" to cause his mobile telephony device to dial the character string which causes the cancellation of unconditional call forwarding.

Because the character string used to cancel call forwarding instructions does not typically include a telephone number, it would be possible for a subscriber to store contacts having the character strings for cancellation of each type of call forwarding instructions. Those contacts could then be re-used multiple times whenever a subscriber wishes to cancel a particular type of call forwarding.

On the other hand, if a new call forwarding access number is assigned to a subscriber's mobile telephony device each time the mobile telephony device registers with the mobile roaming connection unit 300, it would be necessary for the subscriber to store a new contact in his contact list (with a character string that includes the newly assigned forwarding access telephone number) each time that the mobile telephony device re-registers with the mobile roaming connection unit 300. It is unlikely that a previously stored contact could be re-used to implement mobile roaming operations at a later point in time, because at that later point in time a new forwarding access number will have been assigned to the subscriber's mobile telephony device. And that new forwarding access telephone number will not be reflected in the telephone number information that is present in the first contact that was stored in the subscriber's contact list.

However, if the mobile roaming connection unit 300 assigns a static forwarding access number to the subscriber's mobile telephony device for an enduring period of time, the subscriber could store a contact in his contact list having a telephone number that is the character string including the static forwarding access number. That contact could be re-used multiple times by the subscriber to implement call forwarding instructions. Software on the subscriber's mobile telephony device could automatically create the contact.

For example, assume that a subscriber travels to another country on business, that country being outside the subscriber's native telephony service area, and the subscriber intends to remain in the country for a week. Under those circumstances, the mobile roaming connection unit 300 could assign a forwarding access number to the subscriber's mobile telephony device that will remain tied to the mobile telephony device for the entire week. A first contact including the character string for implementing call forwarding to the assigned forwarding access number could then be stored on the subscriber's mobile telephony device. A second contact having the character string used to cancel those call forwarding instructions could also be stored on the subscriber's mobile telephony device. This would allow the subscriber to selectively implement and cancel call forwarding instructions (and thus, mobile roaming operations) by requesting that calls be placed to the first and second stored contacts over the duration of his visit to the foreign country.

In the systems and methods described above in connection with FIGS. 9 and 10, it was assumed that the mobile roaming connection unit 300 was unable to interact directly with the mobile telephony service provider that provides telephony service to a subscriber's mobile telephony device to selectively implement and cancel call forwarding instructions. For this reason, in the systems and methods discussed above, the character strings required to implement and cancel call forwarding instructions are provided to the subscriber, via his mobile telephony device. The subscriber directly interacts with his device to selectively implement and cancel call forwarding instructions (and thus mobile roaming operations).

Unfortunately requiring the subscriber to implement and cancel call forwarding instructions is not ideal. Some subscriber will likely view this as inconvenient and/or too difficult. Also, there is a danger that a subscriber may implement call forwarding instructions (to implement mobile roaming operations), and then forget to cancel the call forwarding instructions once mobile roaming is not longer needed or desired.

In other situations, the subscriber may not be aware when his mobile telephony device can no longer maintain a data connection with the mobile roaming connection unit 300. If that occurs, the subscriber may not even be aware that he should cancel call forwarding instructions so that incoming calls can be received (albeit in a more expensive fashion) via a normal cellular connection.

For all these reasons, in some situations it is desirable for the implementation and cancellation of call forwarding instructions to be performed automatically at the appropriate times. However, as also explained above, in some situations the only way to implement and cancel call forwarding instructions is have the subscriber's mobile telephony device dial a particular character string.

Figure 11:
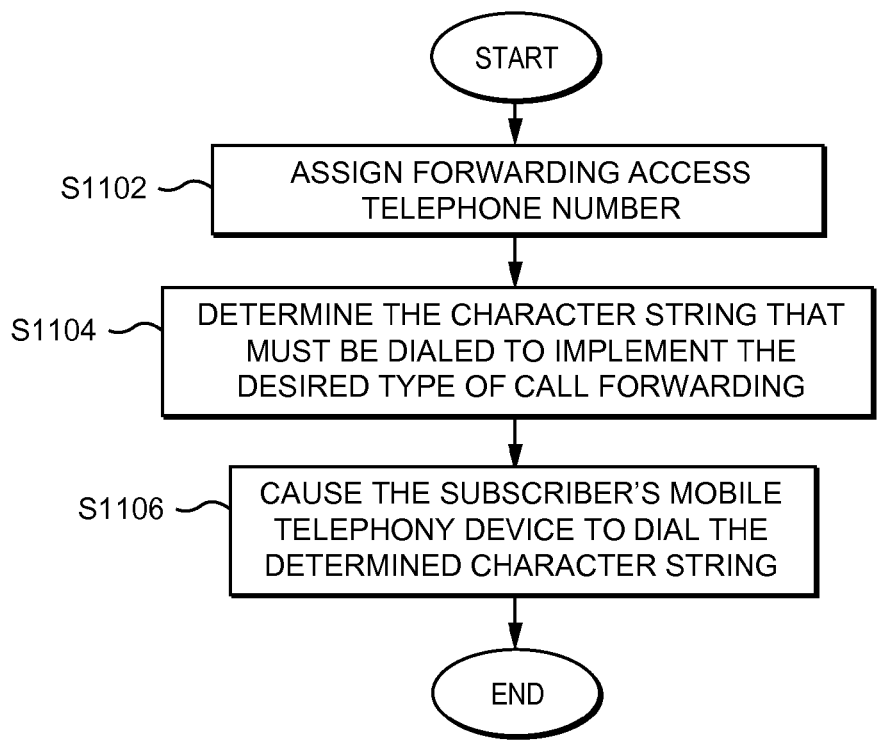
FIG. 11 is a flowchart describing a method in which a mobile telephony device is caused to dial a character string that causes the implementation of call forwarding instructions.

FIG. 11 illustrates steps of a method where call forwarding instructions can be automatically implemented and canceled, without requiring the user to take any active steps, even through a character string must be dialed by the subscriber's mobile telephony device to implement and cancel the call forwarding instructions. In step S1102, the forwarding instruction unit 306 assigns a forwarding access telephone number. Once the forwarding access telephone number is assigned, in step S1104 the forwarding instruction unit 306 determines the character string that must be dialed from the subscriber's mobile telephony device to implement the desired type of call forwarding to the assigned forwarding access number.

In step S1106, the forwarding instruction unit 306 causes the subscriber's mobile telephony device to dial the determined character string. In some embodiments, it may be possible for the forwarding instruction unit 306 to interact directly with the subscriber's mobile telephony device via a data connection to cause the native dialer of the subscriber's mobile telephony device to dial the determined character string. In other embodiments, the forwarding instruction unit 306 may provide the character string to an application that is present on the subscriber's mobile telephony device, along with a direction to cause the character string to be dialed. The application would then cause the native dialer on the subscriber's mobile telephony device to dial the character string.

In a similar fashion, the forwarding instruction unit 306 can determine a character string that will cause call forwarding to be canceled, and the forwarding instruction unit 306 can cause the native dialer on the subscriber's mobile telephony device to dial the character string that cancels call forwarding. This could occur because the forwarding instruction unit 306 is able to interact directly with the native dialer via a data connection, or because the forwarding instruction unit 306 instructs an application on the subscriber's mobile telephony device to cause the dialing of the cancellation string.

In alternate embodiments, the forwarding instruction unit 306 may contact and/or control the native dialer of the user's mobile telephony device through a connection via a cellular data channel, as opposed some other type of data connection. The forwarding instruction unit 306 might also provide instructions to an application running on the subscriber's mobile telephony device via the cellular data connection.

In still other embodiments, the forwarding instruction unit 306 may provide instructions to an application running on the subscriber's mobile telephony device via a push notification. For example, the forwarding instruction unit 306 may cause a push notification to be sent to the subscriber's mobile telephony device that includes the message "Would you like to implement mobile roaming operations?" If the user responds affirmatively, a message would be delivered to an application on the subscriber's mobile telephony device that causes the application to access and control the native dialer on the subscriber's mobile telephony device so that a character string is dialed to implement call forwarding to an assigned forwarding access number. In some instances, the push notification will also cause the application to load and run. Similar push notifications could be used in a similar fashion to cause the cancellation of call forwarding instructions, and thus the termination of mobile roaming operations.

While foregoing is directed to embodiments of the present invention, other and further embodiments of the invention may be devised without departing from the basic scope thereof, and the scope thereof.

The invention claimed is:

1. A method for canceling call forwarding instructions that have previously been implemented by a native telephony service provider that provides a telephony device with its native telephony service, the telephony device having a native telephone number, where the call forwarding instructions resulted in incoming telephony communications directed to the native telephone number being directed to a forwarding access number, the method comprising:
    determining whether previously implemented call forwarding instructions for the telephony device should be canceled, wherein the determining step is performed by at least one processor of a computing device; and
    causing, when the previously implemented call forwarding instructions should be canceled, the native telephony service provider to cancel the previously implemented call forwarding instructions such that incoming telephony communications directed to the native telephone number are no longer directed to the forwarding access number and are instead routed to the native telephone number by:
        determining a character string that can be dialed from the telephony device to cause the native telephony service provider to cancel the call forwarding instructions; and
        providing the determined character string to the telephony device.

2. The method of claim 1, further comprising causing the telephony device to dial the determined character string.

3. The method of claim 1, wherein the providing step comprises providing the determined character string to an application running on the telephony device, and further comprising instructing the application to cause the telephony device to dial the determined character string.

4. The method of claim 1, wherein the providing step comprises causing a message to be displayed or played on the telephony device, the message including the determined character string.

5. The method of claim 1, wherein the providing step comprises sending a telephony communication to the telephony device, wherein the telephony communication includes caller ID information that includes the determined character string.

6. The method of claim 5, wherein the determined character string is provided as the calling telephone number in the caller ID information of the telephony communication.

7. The method of claim 1, wherein the determining step comprises checking a status of a data connection between a non-native telephony service provider and the telephony device, and wherein the determination about whether the call forwarding instructions should be canceled is based on the status of the data connection.

8. The method of claim 7, wherein if no data connection exists between the non-native telephony service provider and the telephony device, it is determined that the call forwarding instructions should be canceled.

9. The method of claim 7, wherein if a quality of a data connection between the non-native telephony service provider and the telephony device is below a threshold value, it is determined that the call forwarding instructions should be canceled.

10. The method of claim 1, wherein the determining step comprises:
    determining a location of the telephony device; and
    determining if the telephony device is within its native service area, and wherein it is determined that the call forwarding instructions should be canceled if the telephony is determined to be located within its native service area.

11. The method of claim 10, wherein determining a location of the telephony device comprises receiving location information from the telephony device.

12. The method of claim 1, wherein the determining step comprises receiving a communication indicating that call forwarding instructions should be canceled.

13. The method of claim 12, wherein the communication is received from the telephony device.

14. The method of claim 12, wherein the communication is received from an application running on the telephony device.

15. The method of claim 1, further comprising:
    determining whether call forwarding instructions should be re-implemented; and
    causing, when the determining step determines that the call forwarding instructions should be re-implemented, the native telephony service provider to implement new call forwarding instructions.

16. The method of claim 1, wherein the forwarding access number is used to route communications directed to the native telephone number to a non-native telephony service provider.

17. A system for canceling call forwarding instructions that have previously been implemented by a native telephony service provider that provides a telephony device with its native telephony service, the telephony device having a native telephone number, where the call forwarding instructions resulted in incoming telephony communications directed to the native telephone number being directed to a forwarding access number, comprising:
    means for determining whether previously implemented call forwarding instructions for the telephony device should be canceled; and means for causing, when the previously implemented call forwarding instructions should be canceled, the native telephony service provider to cancel the previously implemented call forwarding instructions such that incoming telephony communications directed to the native telephone number are no longer directed to the forwarding access number and are instead routed to the native telephone number, wherein the causing means determines a character string that can be dialed from the telephony device to cause the native telephony service provider to cancel the call forwarding instructions, and wherein the causing means provides the determined character string to the telephony device.

18. A system for canceling call forwarding instructions that have previously been implemented by a native telephony service provider that provides a telephony device with its native telephony service, the telephony device having a native telephone number, where the call forwarding instructions resulted in incoming telephony communications directed to the native telephone number being directed to a forwarding access number, comprising:

a triggering unit that determines whether previously implemented call forwarding instructions for the telephony device should be canceled; and a forwarding instruction unit that causes, when the previously implemented call forwarding instructions should be canceled, the native telephony service provider to cancel the previously implemented call forwarding instructions such that incoming telephony communications directed to the native telephone number are no longer directed to the forwarding access number and are instead routed to the native telephone number, wherein the forwarding instruction unit determines a character string that can be dialed from the telephony device to cause the native telephony service provider to cancel the call forwarding instructions, and wherein the forwarding instruction unit provides the determined character string to the telephony device.

19. The system of claim 18, wherein the forwarding instruction unit also causes the telephony device to dial the determined character string.

20. The system of claim 18, wherein the forwarding instruction unit causes a message to be displayed or played on the telephony device, the message including the determined character string.

21. The system of claim 18, wherein the triggering unit checks a status of a data connection between a non-native telephony service provider and the telephony device, and determines whether the call forwarding instructions should be canceled based on the status of the data connection.

22. The system of claim 21, wherein if the triggering unit determines that a quality of a data connection between the non-native telephony service provider and the telephony device is below a threshold value, the triggering unit determines that the call forwarding instructions should be canceled.

23. The system of claim 18, wherein the triggering unit determines that the call forwarding instructions should be canceled if the telephony is determined to be located within its native service area.

24. The system of claim 18, wherein the triggering unit determines that the call forwarding instructions should be canceled in response to receipt of a communication sent from the telephony device.

* * * * *